United States Patent
Xiao et al.

(10) Patent No.: US 9,735,847 B2
(45) Date of Patent: Aug. 15, 2017

(54) SPATIAL MODULATION MULTIPLE-INPUT-MULTIPLE-OUTPUT (SM-MIMO) SYSTEM

(71) Applicant: Empire Technology Development LLC, Wilmington (DE)

(72) Inventors: Yue Xiao, Sichuan (CN); Lixia Xiao, Sichuan (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 155 days.

(21) Appl. No.: 14/382,659

(22) PCT Filed: Oct. 16, 2013

(86) PCT No.: PCT/CN2013/085290
§ 371 (c)(1),
(2) Date: Sep. 3, 2014

(87) PCT Pub. No.: WO2015/054838
PCT Pub. Date: Apr. 23, 2015

(65) Prior Publication Data
US 2016/0233933 A1    Aug. 11, 2016

(51) Int. Cl.
*H04B 7/02*    (2006.01)
*H04B 7/0456*    (2017.01)
(Continued)

(52) U.S. Cl.
CPC ......... *H04B 7/0456* (2013.01); *H04B 7/0604* (2013.01); *H04L 27/18* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04L 1/0003;
(Continued)

(56) References Cited

U.S. PATENT DOCUMENTS 7,382,840 B2    6/2008    Molisch et al.
7,907,689 B2    3/2011    Walton et al.
(Continued)

FOREIGN PATENT DOCUMENTS

CN    1701555 A    11/2005
CN    1985484 A    6/2007

OTHER PUBLICATIONS

Borgmann, M., and Bolcskei, H., "Noncoherent space-frequency coded MIMO-OFDM," IEEE Journal on Selected Areas in Communications, vol. 23, pp. 1-12, (2005).
(Continued)

*Primary Examiner* — Zewdu Kassa
(74) *Attorney, Agent, or Firm* — Brundidge & Stanger, P.C.

(57) ABSTRACT

In an SM-MIMO wireless communication system, multiple transmitting antennae may be utilized to transmit wireless signals that carry signal sequences. A selection of the multiple transmitting antennae may be configured to represent a portion of the signal sequences so that channel state information (CSI) is not required at the receiving end of the SM-MIMO system.

20 Claims, 4 Drawing Sheets

(51) Int. Cl.
*H04B 7/06* (2006.01)
*H04L 27/18* (2006.01)

(58) Field of Classification Search
CPC ....... H04L 1/00; H04B 7/0417; H04B 7/0669; H04B 3/54
USPC ........ 375/267, 261, 260, 259, 295, 316, 219
See application file for complete search history.

(56) References Cited

U.S. PATENT DOCUMENTS

| | | | |
|---|---|---|---|
| 2009/0052578 A1* | 2/2009 | Sawai | H04B 7/0413 375/299 |
| 2009/0238298 A1 | 9/2009 | Kim et al. | |
| 2010/0234071 A1* | 9/2010 | Shabtay | H04B 7/0408 455/562.1 |
| 2010/0260279 A1 | 10/2010 | Sundar Rajan et al. | |
| 2011/0299626 A1 | 12/2011 | Kim et al. | |
| 2012/0027112 A1* | 2/2012 | Jiang | H04B 7/061 375/267 |
| 2012/0134433 A1* | 5/2012 | Haas | H04L 5/0003 375/262 |

OTHER PUBLICATIONS

Hassibi, B., and Hochwald, B, M., "Cayley differential unitary space-time codes," IEEE Trans. Inf. Theory, vol. 48, No. 6, pp. 1485-1503, (2002).

Hochwald, B. M., and Sweldens, W., "Differential unitary space-time modulation," IEEE Trans. Commun., vol. 48, No. 12, pp. 2041-2052, (2000).

Hughes, B.L., "Differential space-time modulation," IEEE Transactions on Information Theory, vol. 46, pp. 1-12, (2000).

Mengi, A., et al., "Space-Time Differentially Coded Orthogonal Matrix Modulation using QAM," EU-COST289 2nd Workshop, Special Topics on 4G Technologies, Jul. 6-7, 2005 pp. 1-7.

Mesleh, R. Y, et al., "Spatial modulation," IEEE Trans. Veh. Technol, vol. 57, No. 4, pp. 2228-2241, (2008).

Mesleh, R., "Spatial modulation—OFDM" in the Proceedings of the 11th International OFDM—Workshop2006 (InOWo'06), pp. 288-292, (2006).

Sugiura, S., et al., "Coherent and differential space-time shift keying: a dispersion matrix approach," IEEE Trans. Commun., vol. 58, No. 11, pp. 3219-3230, (2010).

Sugiura, S., et al., "Coherent versus non-coherent decode-and-forward relaying aided cooperative space-time shift keying," IEEE Trans. Commun., vol. 59, No. 6, pp. 1707-1719, (2011).

Sugiura, S., et al., "Reduced-complexity coherent versus non-coherent QAM-aided space-time shift keying," IEEE Trans. Commun., vol. 59, No. 11, pp. 3090-3101, (2011).

Tarokh, V., et al., "Space—time codes for high data rate wireless communication: Performance criterion and code construction," IEEE Trans. Inf. Theory, vol. 44, No. 2, pp. 744-765, (1998).

Wolniansky, P. W., et al., "V-BLAST: An architecture for realizing very high data rates over the rich-scattering wireless channel," IEEE, pp. 1-6, (1998).

Xu, C., et al., "Reduced-Complexity Noncoherently Detected Differential Space-Time Shift Keying," IEEE Signal Process. Lett., vol. 18, No. 3, pp. 153-156, (2011).

Yang, P., et al., "Initial Performance Evaluation of Spatial Modulation OFDM in LTE-based Systems," 6th International ICST Conference on Communications and Networking in China (CHINACOM), pp. 102-107, (2011).

International Search Report and Written Opinion from International Application No. PCT/CN13/85290 mailed Jul. 16, 2014.

\* cited by examiner

US 9,735,847 B2

SPATIAL MODULATION MULTIPLE-INPUT-MULTIPLE-OUTPUT (SM-MIMO) SYSTEM

CROSS-REFERENCE TO RELATED APPLICATION

This Application is the U.S. National Stage filing under 35 U.S.C. §371 of PCT Application Ser. No. PCT/CN13/85290 filed on Oct. 16, 2013. The disclosure of the PCT Application is hereby incorporated herein by reference in its entirety.

TECHNICAL FIELD

The technologies described herein pertain generally to a spatial modulation multiple-input-multiple-output (SM-MIMO) wireless communication system.

BACKGROUND

Unless otherwise indicated herein, the approaches described in this section are not prior art to the claims in this application and are not admitted to be prior art by inclusion in this section.

In an SM-MIMO wireless communication system, multiple transmitting antennae may be utilized to transmit wireless signals that carry signal sequences to facilitate communications. In some examples, a selection of the multiple transmitting antennae may be configured to represent a portion of the signal sequences so that channel state information (CSI) is not required at the receiving end of the SM-MIMO system.

SUMMARY

Technologies are generally described for an SM-MIMO system. The various techniques described herein may be implemented in various methods, systems, computer-readable mediums, and/or other computer-programmable products.

In some examples, various embodiments may be implemented as methods. Some methods may include receiving multiple sections of a divided signal sequence, each of which includes multiple binary digits; for each of the multiple sections, selecting a first one of multiple transmitting antennae during a time interval in accordance with at least a portion of the multiple binary digits; for each of the multiple sections, generating multiple modulation symbols to be transmitted by the selected first one of the multiple transmitting antennae during the time interval in accordance with the remaining portion of the multiple binary digits; generating a matrix symbol by combining the generated multiple modulation symbols of consecutive ones of the multiple sections; and switching, from the first one of the multiple transmitting antennae, to a second one of the multiple transmitting antennae if the selected first one of the multiple transmitting antennae was selected in a preceding time interval for the matrix symbol.

In some examples, various embodiments may be implemented as systems. Some systems may include multiple transmitting antennae; a signal generator configured to generating a signal sequence; and a modulation module configured to divide the signal sequence into multiple sections, each of which includes multiple binary digits, for each of the multiple sections, select a first one of the multiple transmitting antennae during a time interval in accordance with at least a portion of the multiple binary digits, for each of the multiple sections, generate multiple modulation symbols to be transmitted by the selected first one of the multiple transmitting antennae during the time interval in accordance with other portions of the multiple binary digits, generate a matrix symbol by combining the generated multiple modulation symbols of consecutive ones of the multiple sections; and switching to a second one of the multiple transmitting antennae if the selected first one of the multiple transmitting antennae was selected in a preceding time interval for the matrix symbol.

In some examples, various embodiments may be implemented as computer-readable mediums having executable instructions stored thereon. Some computer-readable mediums may store instructions that, when executed, cause one or more processors to perform operations including receiving multiple sections of a divided signal sequence, each of which includes multiple binary digits; for each of the multiple sections, selecting a first one of multiple transmitting antennae during a time interval in accordance with at least a portion of the multiple binary digits; for each of the multiple sections, generating multiple modulation symbols to be transmitted by the selected first one of the multiple transmitting antennae during the time interval in accordance with the remaining portion of the multiple binary digits; generating a matrix symbol by combining the generated multiple modulation symbols of consecutive ones of the multiple sections; switching to a second one of the multiple transmitting antennae if the selected first one of the multiple transmitting antennae was selected in a preceding time interval for the matrix symbol; differential encoding the multiple modulation symbols of the matrix symbol; transmitting the encoded modulation symbols via the selected first one of the multiple transmitting antennae if the first one of the multiple transmitting antennae was not selected in the preceding time interval for the matrix symbol; and transmitting the encoded modulation symbols via the second one of the multiple transmitting antennae if the first one of the multiple transmitting antennae was selected in the preceding time interval for the matrix symbol.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
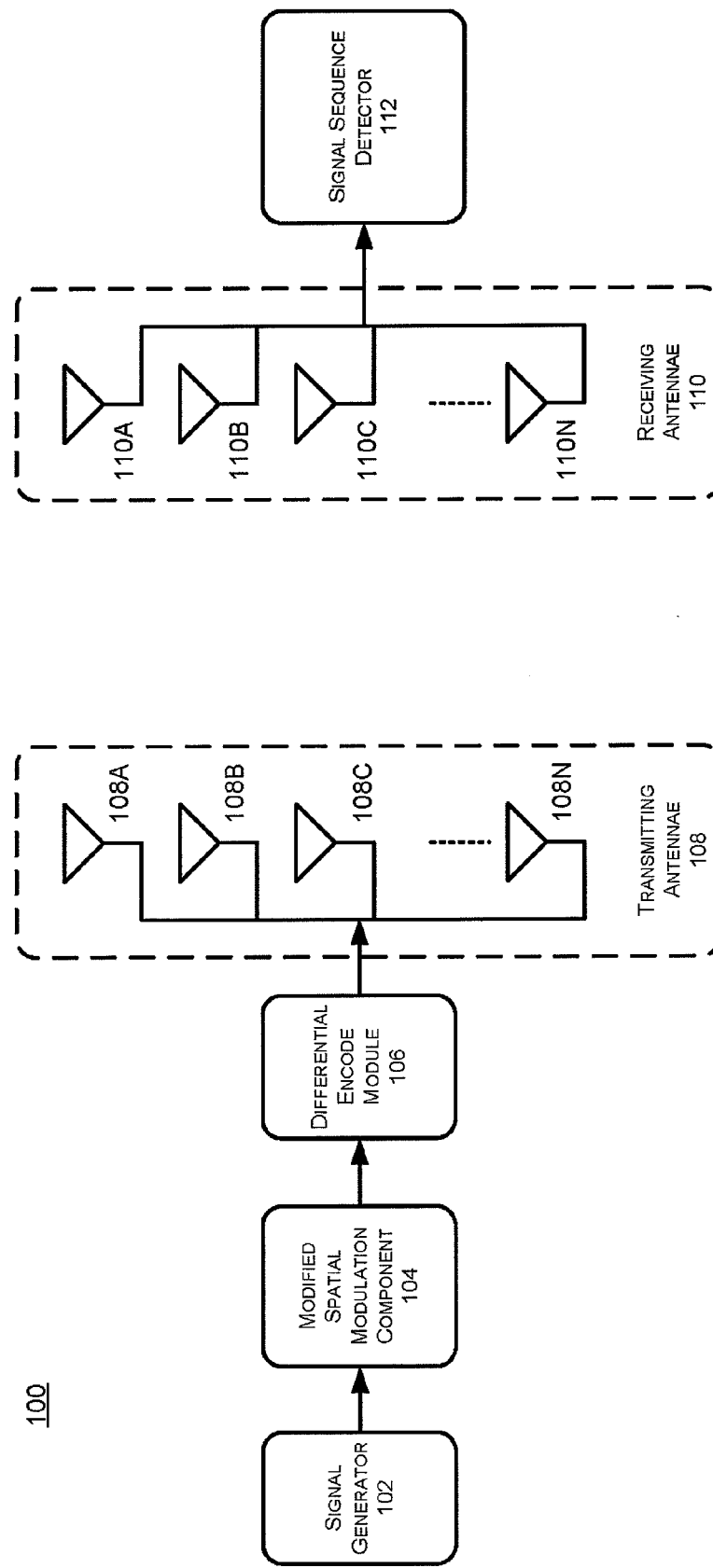
FIG. 1 shows an example system in which an SM-MIMO system may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which an SM-MIMO system may be implemented, arranged in accordance with at least some embodiments described herein. As depicted, example system 100 may include at least a signal generator 102, a modified spatial modulation component 104, a differential encode module 106, multiple transmitting antennae 108A, 108B, 108C, . . . , 108N; multiple receiving antennae 110A, 110B, 110C, . . . , 110N; and a signal sequence detector 112. Unless context requires specific reference to one or more of transmitting antennae 108A, 108B, 108C, . . . , 108N, collective reference may be made to "transmitting antennae 108" below; similarly, unless context requires otherwise, collective reference may be made to "receiving antennae 110" below.

Signal generator 102 may refer to a component configured to generate multiple signal sequences that respectively include binary digits, e.g., 100011001000100110011001. In accordance with various embodiments, signal generator 102 may be implemented as hardware, firmware, software, or any combination thereof. The binary digits may then be transmitted to modified spatial modulation component 104.

Modified spatial modulation component 104 may refer to a component that is communicatively couple to signal generator 102 and that is configured to divide each of the signals sequences received from signal generator 102 into multiple sections. Each of the multiple sections may include multiple binary digits. For example, modified spatial modulation component 104 may divide a signal sequence such as 100011001000100110011001 into eight sections, e.g., 100, 011, 001, 000, 100, 110, 011, and 001. Each section may be transmitted during a time interval. For each of the multiple sections, modified spatial modulation component 104 may then be configured to select one or more from multiple transmitting antennae 108 during the time interval in accordance with at least a portion of the multiple binary digits of a respective section. In a non-limiting example, transmitting antennae 108 may refer to two transmitting antennae, namely, antenna 108A and antenna 108B. Such selection may be illustrated by a spatial modulation mapping table as shown below.

| Binary digits | Antenna index | Modulation symbols |
|---|---|---|
| 000 | 108A | 1 |
| 001 | 108A | $e^{j*\frac{\pi}{4}}$ |
| 010 | 108A | $e^{j*\frac{\pi}{2}}$ |
| 011 | 108A | $e^{j*\frac{3\pi}{4}}$ |
| 100 | 108B | 1 |
| 101 | 108B | $e^{j*\frac{\pi}{4}}$ |
| 110 | 108B | $e^{j*\frac{\pi}{2}}$ |
| 111 | 108B | $e^{j*\frac{3\pi}{4}}$ |

In a non-limiting example with respect to a section that includes three binary digits, 010, modified spatial modulation component 104 may be configured to select antenna 108A from transmitting antenna 108 since the first binary digit of the section is 0.

Further, modified spatial modulation component 104 may be configured to generate one or more modulation symbols to be transmitted by the selected one or more transmitting antennae during the time interval in accordance with remaining portions of the multiple binary digits of the respective section. Further to the aforementioned non-limiting example, modified spatial modulation component 104 may be configured to generate a modulation symbol that corresponds to the last two binary digits of the section, i.e., 10, in accordance with the spatial modulation mapping table. Thus, antenna 108A may be configured to transmit the modulation symbol, $$e^{j*\frac{\pi}{2}},$$

and antenna 108B transmits zero.

Modified spatial modulation component 104 may further be configured to generate multiple matrix symbols by combining the one or more modulation symbols of consecutive ones of the multiple sections. In the aforementioned example, the modulation symbols generated for the first and the second sections, 100 and 011, may respectively be $$\begin{bmatrix} 0 \\ 1 \end{bmatrix} \text{ and } \begin{bmatrix} e^{j\frac{3\pi}{4}} \\ 0 \end{bmatrix}.$$

The matrix symbol for the two sections may be generated as $$\begin{bmatrix} 0 & e^{j\frac{3\pi}{4}} \\ 1 & 0 \end{bmatrix}.$$

With respect to the third and fourth sections, 001 and 000, the matrix symbol may be generated as $$\begin{bmatrix} e^{j\frac{\pi}{4}} & 1 \\ 0 & 0 \end{bmatrix}.$$

For each of the matrix symbols, modified spatial modulation component 104 may further be configured to determine whether the selected one or more transmitting antennae was previously selected in a preceding time interval. If so, modified spatial modulation component 104 may then be configured to switch, from the selected one or more transmitting antennae, to another or other ones of transmitting antennae 108. Otherwise, the selected one or more transmitting antennae may be utilized to transmit the corresponding modulation symbols. Further to the example above, as to the matrix symbol generated for the third and fourth sections, i.e., $$\begin{bmatrix} e^{j\frac{\pi}{4}} & 1 \\ 0 & 0 \end{bmatrix},$$

antenna 108A was selected during the time interval for the third section and then is again selected during the time interval for the fourth section. Thus, modified spatial modulation component 104 may then be configured to switch, from antenna 108A, to antenna 108B for transmitting the fourth section of the signal sequence. In at least some examples, a matrix symbol of an ith signal sequence may be referred to as $S_i(v)$.

In accordance with various embodiments, modified spatial modulation component 104 may be implemented as hardware, firmware, software, or any combination thereof.

Differential encode module 106 may refer to a component configured to differential encode the modulation symbols of each matrix symbol. That is, the encoded modulation symbols on a frequency domain may be referred as $T_i(v)$ and further calculated in accordance with the following equation. $T_i(v)=T_i(v-1)S_i(v)$, $T_i(0)=I$, in which I is an identity matrix. Similarly, the encoded modulation symbols on a time domain may be calculated as $T_i(v)=T_{i-1}(v)S_i(v)$, $T_0(v)=I$. In accordance with various embodiments, differential encode module 106 may be implemented as hardware, firmware, software, or any combination thereof.

Transmitting antennae 108 may refer to multiple antennae configured to convert one or more modulation symbols into corresponding wireless signals in the form of electromagnetic waves and further transmit the wireless signals. That is, the selected one or more of transmitting antennae 108 may be configured to transmit the differential encoded modulation symbols, $T_i(v)$.

Receiving antennae 110 may refer to multiple antennae configured to receive the electromagnetic waves that carry the wireless signals and relay the wireless signals to signal sequence detector 112. The received wireless signals may be referred to as $Y_i(v)=H_i(v)T_i(v)+N_i(v)$, in which $H_i(v)$ represents a channel matrix that describes the characteristics of the communication channel and $N_i(v)$ represents a noise matrix that describes the noise over the communication channel. Both $H_i(v)$ and $N_i(v)$ are assumed to obey the complex-valued Gaussian distribution of $X\sim N(0,1)$ and of $X\sim N(0, N_0)$, respectively, where $N_0$ represents the noise variance.

Signal sequence detector 112 may refer to a component configured to detect, or restore, the signal sequences from the received wireless signals. In a non-limiting example, the signal sequences may be calculated in accordance with the formula:

$$(S_i^{\wedge}(v)) = \arg \min_{S_i(v)} \| Y_i(v) - Y_{i-1}(v)S_i^{\wedge}(v) \|^2.$$

Figure 2:
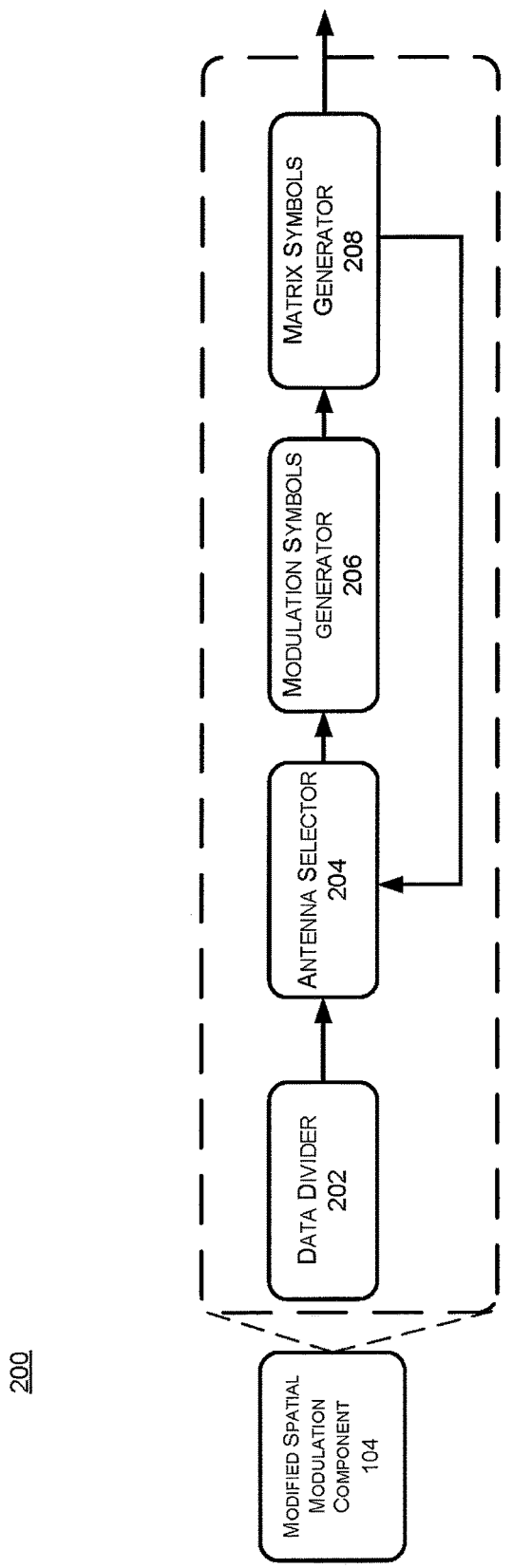
FIG. 2 shows an example configuration of an example modified spatial modulation component by which an SM-MIMO system may be implemented.

Thus, example system 100 may include multiple components, at the transmitting end, configured to convert signal sequences into modulation symbols and transmit the modulation symbols and other components, at the receiving end, configured to detect, or restore, the signals sequences. FIG. 2 shows an example configuration 200 of an example modified spatial modulation component by which an SM-MIMO system may be implemented, arranged in accordance with at least some embodiments described herein. As depicted, example configuration 200 may include at least a data divider 202, an antenna selector 204, a modulation symbols generator 206, and a matrix symbols generator 208.

Data divider 202 may refer to a component configured to divide a signal sequence, or an Orthogonal Frequency Division Multiplex (OFDM) block, into multiple sections, each of which includes multiple binary digits. The count of the multiple sections may be determined by the count of subcarriers of the signal sequence. For example, a signal sequence, or an OFDM block, may have eight subcarriers and a signal sequence such as 100011001000100110011001 may then be divided into eight sections, e.g., 100, 011, 001, 000, 100, 110, 011, and 001. The divided signal sequence may also be in a form of matrix $$Q_i = \begin{bmatrix} 1 & 0 & 0 & 0 & 1 & 1 & 0 & 0 \\ 0 & 1 & 0 & 0 & 0 & 1 & 1 & 0 \\ 0 & 1 & 1 & 0 & 0 & 0 & 1 & 1 \end{bmatrix}.$$

Each section may be transmitted during a time interval. The count of binary digits within each section may be determined by the count of transmitting antennae 108 and a modulation scheme adopted by the wireless communication system. Specifically, the count of binary digits within each section may be referred to as $C=\log_2(L)+\log_2(T)$, in which T represents the count of transmitting antennae 108 and L is determined by the modulation scheme. For example, L is 4 if the wireless communication system adopts a Quadrature Phase Shift Keying (QPSK) scheme. In accordance with various embodiments, data divider 202 may be implemented as hardware, firmware, software, or any combination thereof.

Antenna selector 204 may refer to a component configured to select one or more from transmitting antennae 108 for each of the multiple sections during the respective time interval in accordance with at least a portion of the binary digits in the section. For example, the first binary digit of each section may be determined to represent one of transmitting antennae 108. More specifically, when transmitting antennae 108 refer to two transmitting antennae, namely, antenna 108A and antenna 108B, antenna 108A may be selected to transmit wireless signals if the first binary digit of a respective section is 0 and antenna 108B may be selected if the first binary digit is 1. Such selection may be illustrated by the spatial modulation mapping table shown above. In accordance with various embodiments, antenna selector 204 may be implemented as hardware, firmware, software, or any combination thereof.

Modulation symbols generator 206 may refer to a component configured to generate one or more modulation symbols to be transmitted by the selected one or more transmitting antennae during the time interval in accordance with the remaining portion of the multiple binary digits of the respective section. In a non-limiting example with respect to a section that includes three binary digits, 010, modulation symbols generator 206 may be configured to generate a modulation symbol that corresponds to the last two binary digits of the section, i.e., 10, in accordance with the spatial modulation mapping table. Thus, antenna 108A may be configured to transmit the modulation symbol, $$e^{j*\frac{\pi}{2}},$$

and antenna 108B transmits zero. The modulation symbol for the section may then be represented as $$\begin{bmatrix} e^{j*\frac{\pi}{2}} \\ 0 \end{bmatrix}.$$

With respect to the example signal sequence, $Q_i$, the modulation symbols for the multiple sections may be referred to as $S_i(v)=(s_i(1),s_i(2),s_i(3),s_i(4),s_i(5),s_i(6),s_i(7),s_i(8))$ and further may be represented as $$\begin{bmatrix} 0 & e^{j*\frac{3\pi}{4}} & e^{j*\frac{\pi}{4}} & 1 & 0 & 0 & e^{j*\frac{3\pi}{4}} & e^{j*\frac{\pi}{4}} \\ 1 & 0 & 0 & 0 & 1 & e^{j*\frac{\pi}{2}} & 0 & 0 \end{bmatrix}.$$

Matrix symbols generator 208 may refer to a component configured to generate multiple matrix symbols by combining the one or more modulation symbols of consecutive ones of the multiple sections. In the aforementioned example, the modulation symbols generated for the first and the second sections, 100 and 011, may respectively be $$\begin{bmatrix} 0 \\ 1 \end{bmatrix} \text{ and } \begin{bmatrix} e^{j*\frac{3\pi}{4}} \\ 0 \end{bmatrix}.$$

The matrix symbol for the two sections may be generated as $$\begin{bmatrix} 0 & e^{j\frac{3\pi}{4}} \\ 1 & 0 \end{bmatrix}.$$

With respect to the third and fourth sections, 001 and 000, the matrix symbol may be generated as $$\begin{bmatrix} e^{j\frac{\pi}{4}} & 1 \\ 0 & 0 \end{bmatrix}.$$

For each of the matrix symbols, matrix symbols generator 208 may further be configured to determine whether the selected one or more transmitting antennae was previously selected in a preceding time interval. If so, antenna selector 204 may then be configured, by matrix symbols generator 208, to switch, from the selected one or more transmitting antennae, to another or other ones of transmitting antenna 108. Otherwise, the selected one or more transmitting antennae may be utilized to transmit the corresponding modulation symbols. Further to the example above, as to the matrix symbol generated for the third and fourth sections, i.e., $$\begin{bmatrix} e^{j\frac{\pi}{4}} & 1 \\ 0 & 0 \end{bmatrix},$$

antenna 108A was selected during the time interval for the third section and then is again selected during the time interval for the fourth section. Thus, antenna selector 204 may then be configured to switch, from antenna 108A, to antenna 108B for transmitting the modulation symbol of the fourth section of the signal sequence. In at least some examples, the modulation symbol, when transmitted after switching the transmitting antenna, may be modified by multiplying $$e^{j\frac{2\pi*num}{LT}},$$

in which num may refer to a count of times that matrix symbols generator 208 performs the determination. In accordance with various embodiments, matrix symbols generator 208 may be implemented as hardware, firmware, software, or any combination thereof.

Figure 3:
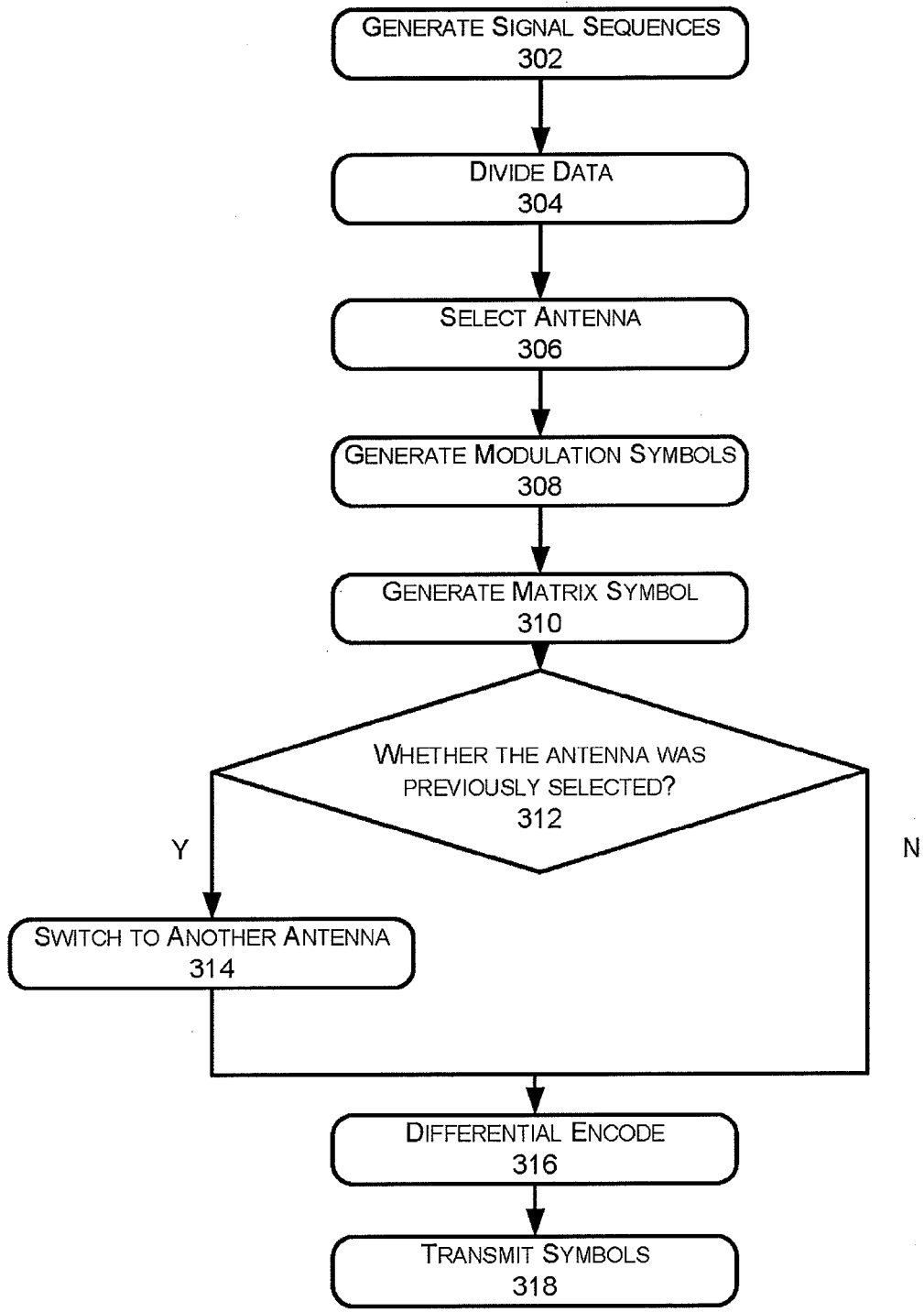
FIG. 3 shows an example configuration of a processing flow of operations by which an SM-MIMO system may be implemented.

FIG. 3 shows an example configuration of a processing flow of operations by which an SM-MIMO system may be implemented, arranged in accordance with at least some embodiments described herein. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, 312, 314, 316, and/or 318. Processing may begin at block 302.

Block 302 (Generate Signal Sequences) may refer to signal generator 102 generating multiple signal sequences that respectively include binary digits, e.g., 10001100100010011001. The binary digits may then be transmitted to modified spatial modulation component 104. Block 302 may be followed by block 304.

Block 304 (Divide Data) may refer to data divider 202 dividing each of the signal sequences into multiple sections, each of which includes multiple binary digits. The count of the multiple sections may be determined by the count of subcarriers of the signal sequence. For example, a signal sequence, or an OFDM block, may have eight subcarriers and a signal sequence such as 10001100100010011001 may then be divided into eight sections, e.g., 100, 011, 001, 000, 100, 110, 011, and 001. The divided signal sequence may also be in a form of matrix, e.g., $$Q_i = \begin{bmatrix} 1 & 0 & 0 & 0 & 1 & 1 & 0 & 0 \\ 0 & 1 & 0 & 0 & 0 & 1 & 1 & 0 \\ 0 & 1 & 1 & 0 & 0 & 0 & 1 & 1 \end{bmatrix}.$$

Each section may be transmitted during a time interval. The count of binary digits within each section may be determined by the count of transmitting antennae 108 and a modulation scheme adopted by the wireless communication system. Specifically, the count of binary digits within each section may be referred to as $C=\log_2(L)+\log_2(T)$, in which T represents the count of transmitting antennae 108 and L is determined by the modulation scheme. For example, L is 4 if the wireless communication system adopts a Quadrature Phase Shift Keying (QPSK) scheme. Block 304 may be followed by block 306.

Block 306 (Select Antenna) may refer to antenna selector 204 selecting one or more from transmitting antennae 108 for each of the multiple sections during the respective time interval in accordance with at least a portion of the binary digits in the section. For example, the first binary digit of each section may be determined to represent one of transmitting antennae 108. More specifically, when transmitting antennae 108 refer to two transmitting antennae, namely, antenna 108A and antenna 108B, antenna 108A may be selected to transmit wireless signals if the first binary digit of a respective section is 0 and antenna 108B may be selected if the first binary digit is 1. Such selection may be illustrated by the spatial modulation mapping table shown above. Block 306 may be followed by block 308.

Block 308 (Generate Modulation Symbols) may refer to modulation symbols generator 206 generating one or more modulation symbols to be transmitted by the selected one or more transmitting antennae during the time interval in accordance with the remaining portion of the multiple binary digits of the respective section. In a non-limiting example with respect to a section that includes three binary digits, 010, modulation symbols generator 206 may be configured to generate a modulation symbol that corresponds to the last two binary digits of the section, i.e., 10, in accordance with the spatial modulation mapping table. Thus, antenna 108A may be configured to transmit the modulation symbol, $$e^{j*\frac{\pi}{2}},$$

and antenna 108B transmits zero. The modulation symbol for the section may then be represented as $$\begin{bmatrix} e^{j*\frac{\pi}{2}} \\ 0 \end{bmatrix}.$$

With respect to the example signal sequence, $Q_i$, the modulation symbols for the multiple sections may be referred to as $S_i(v)=(s_i(1),s_i(2),s_i(3),s_i(4),s_i(5),s_i(6),s_i(7),s_i(8))$ and further may be represented as $$\begin{bmatrix} 0 & e^{j*\frac{3\pi}{4}} & e^{j*\frac{\pi}{4}} & 1 & 0 & 0 & e^{j*\frac{3\pi}{4}} & e^{j*\frac{\pi}{4}} \\ 1 & 0 & 0 & 0 & 1 & e^{j*\frac{\pi}{2}} & 0 & 0 \end{bmatrix}.$$

Block 308 may be followed by block 310.

Block 310 (Generate Matrix Symbol) may refer to matrix symbols generator 208 generating multiple matrix symbols by combining the one or more modulation symbols of consecutive ones of the multiple sections. In the aforementioned example, the modulation symbols generated for the first and the second sections, 100 and 011, may respectively be $$\begin{bmatrix} 0 \\ 1 \end{bmatrix} \text{ and } \begin{bmatrix} e^{j\frac{3\pi}{4}} \\ 0 \end{bmatrix}.$$

The matrix symbol for the two sections may be generated as $$\begin{bmatrix} 0 & e^{j\frac{3\pi}{4}} \\ 1 & 0 \end{bmatrix}.$$

With respect to the third and fourth sections, 001 and 000, the matrix symbol may be generated as $$\begin{bmatrix} e^{j\frac{\pi}{4}} & 1 \\ 0 & 0 \end{bmatrix},$$

Block 310 may be followed by decision block 312.

Decision block 312 (Whether the antenna was previously selected?) may refer to matrix symbols generator 208 determining whether the selected one or more transmitting antennae was previously selected in a preceding time interval. If so, decision block 312 may be followed by block 314. If not, decision block 312 may be followed by block 316.

Block 314 (Switch to Another Antenna) may refer to antenna selector 204, configured by matrix symbols generator 208, switching, from the selected one or more transmitting antennae, to another or other ones of transmitting antennae 108. Further to the example above, as to the matrix symbol generated for the third and fourth sections, i.e., $$\begin{bmatrix} e^{j\frac{\pi}{4}} & 1 \\ 0 & 0 \end{bmatrix},$$

antenna 108A was selected during the time interval for the third section and then is again selected during the time interval for the fourth section. Thus, antenna selector 204 may then be configured to switch, from antenna 108A, to antenna 108B for transmitting the modulation symbol of the fourth section of the signal sequence. In at least some examples, the modulation symbol, when transmitted after switching the transmitting antenna, may be modified by multiplying $$e^{j\frac{2\pi*num}{LT}},$$

in which num may refer to a count of times that matrix symbols generator 208 performs the determination. Block 314 may be followed by block 316.

Block 316 (Differential Encode) may refer to differential encode module 106 differential encoding the modulation symbols of each matrix symbol. That is, the encoded modulation symbols on a frequency domain may be referred as $T_i(v)$ and further calculated in accordance with the following equation. $T_i(v)=T_i(v-1)S_i(v), T_i(0)=I$, in which I is an identity matrix. Similarly, the encoded modulation symbols on a time domain may be calculated as $T_i(v)=T_{i-1}(v)S_i(v), T_0(v)=I$. Block 316 may be followed by block 318.

Block 318 (Transmit Symbols) may refer to transmitting antenna 108 converting one or more modulation symbols into corresponding wireless signals in the form of electromagnetic waves and further transmitting the wireless signals. That is, the selected one or more of transmitting antennae 108 may be configured to transmit the differential encoded modulation symbols, $T_i(v)$.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
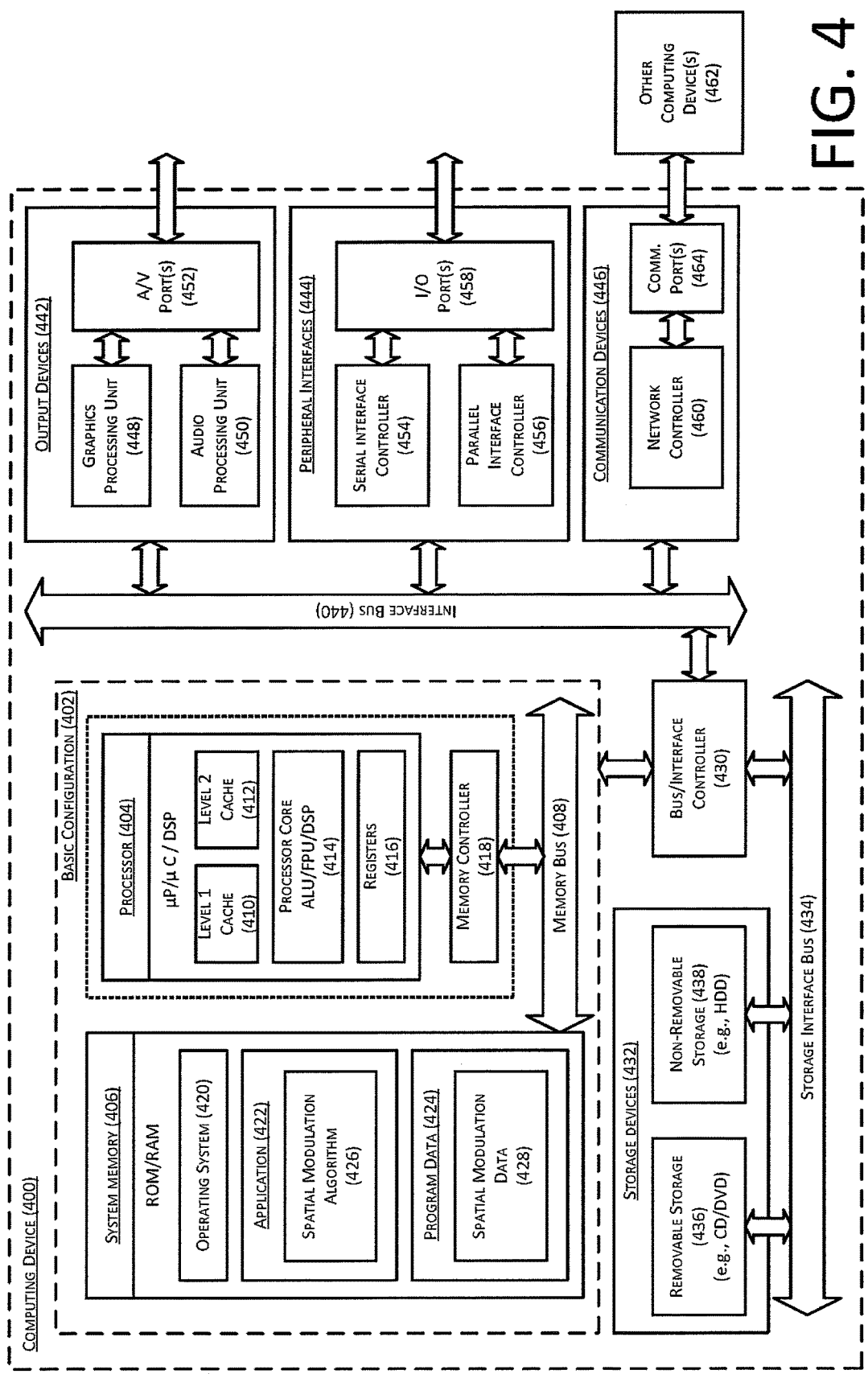
FIG. 4 shows a block diagram illustrating an example computing device that is arranged for an SM-MIMO system.

FIG. 4 shows a block diagram illustrating an example computing device that is arranged for an SM-MIMO system, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a spatial modulation algorithm 426 that is arranged to perform the functions as described herein including those described herein including those described with respect to process 300 of FIG. 3. Program data 424 may include spatial modulation data 428 that may be useful for operation with spatial modulation algorithm 426 as is described herein. In some embodiments, application 422 may be arranged to operate with program data 424 on operating system 420 such that implementations of spatial modulation may be provided as describe herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to modulate sequences in a wireless communication system, the method comprising:
receiving multiple sections of a divided signal sequence, each of the multiple sections includes multiple binary digits;
for each of the multiple sections, selecting a first one of multiple transmitting antennae during a time interval in accordance with at least a portion of the multiple binary digits that includes a first binary digit of the multiple binary digits;
for each of the multiple sections, generating multiple modulation symbols to be transmitted by the selected first one of the multiple transmitting antennae during the time interval in accordance with other portions of the multiple binary digits that include portions other than the first binary digit of the multiple binary digits;
generating a matrix symbol by combining the generated multiple modulation symbols of consecutive ones of the multiple sections; and
switching, from the first one of the multiple transmitting antennae, to a second one of the multiple transmitting antennae when the first one of the multiple transmitting antennae was selected in a preceding time interval for the matrix symbol.

2. The method of claim 1, further comprising:
differential encoding the generated multiple modulation symbols of the matrix symbol;
transmitting the encoded modulation symbols via the selected first one of the multiple transmitting antennae when the first one of the multiple transmitting antennae was not selected in the preceding time interval for the matrix symbol; and
transmitting the encoded modulation symbols via the second one of the multiple transmitting antennae when the first one of the multiple transmitting antennae was selected in the preceding time interval for the matrix symbol.

3. The method of claim 1, further comprising mapping the at least a portion of the multiple binary digits to one of the multiple transmitting antennae in accordance with a predetermined spatial modulation mapping table.

4. The method of claim 1, wherein the generating the multiple modulation symbols comprises generating the multiple modulation symbols in accordance with a Phase-Shifting Keying (PSK) scheme.

5. The method of claim 1, wherein the signal sequence is divided into the multiple sections in accordance with a count of multiple subcarriers determined to transmit the signal sequence.

6. The method of claim 1, wherein the generating the matrix symbol comprises selecting the consecutive ones of the multiple sections in accordance with a count of the multiple transmitting antennae.

7. The method of claim 3, wherein the generating the matrix symbol further comprises mapping the other portions of the multiple binary digits to the multiple modulation symbols in accordance with the predetermined spatial modulation mapping table.

8. A wireless communication system, comprising:
multiple transmitting antennae;
a signal generator configured to generate a signal sequence; and
a modulation module configured to:
divide the signal sequence into multiple sections, each of the multiple sections includes multiple binary digits,
for each of the multiple sections, select a first one of the multiple transmitting antennae during a time interval in accordance with at least a portion of the multiple binary digits that includes a first binary digit of the multiple binary digits,
for each of the multiple sections, generate multiple modulation symbols to be transmitted by the selected first one of the multiple transmitting antennae during the time interval in accordance with other portions of the multiple binary digits that include portions other than the first binary digit of the multiple binary digits, generate a matrix symbol by combining the generated multiple modulation symbols of consecutive ones of the multiple sections, and switch to a second one of the multiple transmitting antennae when the first one of the multiple transmitting antennae was selected in a preceding time interval for the matrix symbol.

9. The system of claim 8, wherein the modulation module is further configured to:

differential encode the generated multiple modulation symbols of the matrix symbol based on at least a matrix symbol generated for an immediately preceding section;

transmit the encoded modulation symbols via the selected first one of the multiple transmitting antennae when the first one of the multiple transmitting antennae was not selected in the preceding time interval for the matrix symbol; and transmit the encoded modulation symbols via the second one of the multiple transmitting antennae when the first one of the multiple transmitting antennae was selected in the preceding time interval for the matrix symbol.

10. The system of claim 8, wherein the modulation module is further configured to map the at least a portion of the multiple binary digits to one of the multiple transmitting antennae in accordance with a predetermined spatial modulation mapping table.

11. The system of claim 8, wherein the multiple modulation symbols are generated in accordance with a Phase-Shifting Keying (PSK) scheme.

12. The system of claim 8, wherein a count of the multiple sections is equal to a count of multiple subcarriers determined to transmit the signal sequence.

13. The system of claim 8, wherein a count of the consecutive ones of the multiple sections is equal to a count of the multiple transmitting antennae.

14. The system of claim 10, wherein the modulation module is further configured to map the other portions of the multiple binary digits to the multiple modulation symbols in accordance with the predetermined spatial modulation mapping table.

15. A non-transitory computer-readable medium that stores executable-instructions that, when executed, cause one or more processors to perform operations comprising:

receiving multiple sections of a divided signal sequence, each of the multiple sections includes multiple binary digits;

for each of the multiple sections, selecting a first one of multiple transmitting antennae during a time interval in accordance with at least a portion of the multiple binary digits that includes a first binary digit of the multiple binary digits;

for each of the multiple sections, generating multiple modulation symbols to be transmitted by the selected first one of the multiple transmitting antennae during the time interval in accordance with other portions of the multiple binary digits that include portions other than the first binary digit of the multiple binary digits;

generating a matrix symbol by combining the generated multiple modulation symbols of consecutive ones of the multiple sections;

switching to a second one of the multiple transmitting antennae when the first one of the multiple transmitting antennae was selected in a preceding time interval for the matrix symbol;

differential encoding the generated multiple modulation symbols of the matrix symbol;

transmitting the encoded modulation symbols via the selected first one of the multiple transmitting antennae when the first one of the multiple transmitting antennae was not selected in the preceding time interval for the matrix symbol; and transmitting the encoded modulation symbols via the second one of the multiple transmitting antennae when the first one of the multiple transmitting antennae was selected in the preceding time interval for the matrix symbol.

16. The non-transitory computer-readable medium of claim 15, further comprising mapping the at least a portion of the multiple binary digits to one of the multiple transmitting antennae in accordance with a predetermined spatial modulation mapping table.

17. The non-transitory computer-readable medium of claim 15, wherein the generating the multiple modulation symbols comprises generating the multiple modulation symbols in accordance with a Phase-Shifting Keying (PSK) scheme.

18. The non-transitory computer-readable medium of claim 15, wherein the signal sequence is divided into the multiple sections in accordance with a count of multiple subcarriers determined to transmit the signal sequence.

19. The non-transitory computer-readable medium of claim 15, wherein the generating the matrix symbol comprises selecting the consecutive ones of the multiple sections in accordance with a count of the multiple transmitting antennae.

20. The non-transitory computer-readable medium of claim 16, wherein the generating the matrix symbol further comprises mapping the other portions of the multiple binary digits to the multiple modulation symbols in accordance with the predetermined spatial modulation mapping table.

* * * * *